UNITED STATES PATENT OFFICE.

HERMANN CLAASSEN, OF DORMAGEN, GERMANY.

PROCESS OF BOILING SUGAR SOLUTIONS.

SPECIFICATION forming part of Letters Patent No. 723,990, dated March 31, 1903.

Application filed August 25, 1902. Serial No. 120,992. (No specimens.)

*To all whom it may concern:*

Be it known that I, HERMANN CLAASSEN, a subject of the King of Prussia, Emperor of Germany, and a resident of Dormagen, Rhenish Prussia, German Empire, have invented new and useful Improvements in Processes of Boiling Sugar Solutions, especially thick juices, of which the following is a specification.

The boiling of purer juices or saccharine solutions to grain was hitherto examined by taking tests in order to ascertain the progress of the boiling process by the outer appearance of the boiling masses. Such examination was based upon the skill or ability of the operator, especially with a view to the production of crystals in a uniform size. The regulating of the boiling according to the outer appearance or quality of the masse-cuite will, however, always remain an uncertain or incomplete one, because the concentration of the saccharine solution cannot exactly be determined by the outer appearance. The concentration, however, is of the utmost importance for the course of the boiling process. Such boiling can only render a good result if the stages of concentration are regulated according to requirement for the formation of grain and the further growing of the grain formed according to the purity of the saccharine solution in the different stages of the boiling process. According to the process of the present invention the boiling of purer sugar solutions—for instance, thick juices—is so conducted that by maintaining distinct degrees of over saturation, which vary in the process of boiling, the formation of grain and the growth of the grain formed is carried on, so that always the optimum for the crystallization is present without formation of new grain.

It is the quotient of oversaturation which serves for determining the degree of oversaturation. This quotient consists of a figure which is obtained if the quantity of sugar dissolved in one part of water in the concentrated saccharine solution is divided by the quantity of sugar which at the same temperature is contained in one part of water in the saturated saccharine solution. If by test a higher contents of sugar is found than should be present in consideration of the contents of water in the saccharine solution, of the purity of the latter, and of the temperature in a saturated solution, then the saccharine solution is oversaturated. If, therefore, the contents of sugar in a concentrated solution should be four parts of sugar in one part of water, in the concentrated saccharine solution, however, for one part of water five parts of sugar, then the division will show five-fourths equals 1.25 and this figure represents the quotient of oversaturation. This quotient of oversaturation is the only determining factor for that concentration necessarily to be chosen for the formation of grain and for the succeeding growth of crystals. By taking into proper account this quotient of oversatuation, the temperature and purity of of the saccharine solution, the boiling process may be carried on with such proportions of contents of water that the operation is performed with predetermined degrees of oversaturation. In the boiling process it is furthermore necessary to maintain in the vacuum-pan such a temperature as corresponds to the vacuum for the time being and to the necessary contents of water in the saccharine solution.

The separation of the sugar from a solution of a concentration with the desired quotient of oversaturation requires, however, some period of time, during which the contents of water and the temperature corresponding to the vacuum must be maintained. An admission of heat by means of heating-bodies will cause a decrease of water and is therefore not to be recommended. As a preferable means for the purpose indicated the introduction of steam into the mass has proved to be successful. As such steam is subject to the action of the vacuum it will issue as steam from the saccharine solution with the temperature of the vapor and will introduce into said solution so much heat only as is required for keeping up said solution on a boiling temperature, according to the vacuum and the concentration, without causing an increase or a decrease of water. It is well known that motion is favorable for the process of crystallization. It is therefore recommended to use with the process of the present invention a mechanical stirrer in the vacuum-pan. In order to determine the existing contents of water of the syrup and in order to be enabled to immediately ascertain or state the boiling temperature, it is recommended to make use of the controlling apparatus according to my United States Patent No. 661,756.

The most suitable quotient of oversaturation for the formation of grain or crystals with thick or concentrated juices in the beet-root-sugar mills and with juices of similar constitution, if these juices have a purity of ninety-three to ninety-one, is 1.35 to 1.45. As soon as with this oversaturation sufficient grain or crystal is formed the oversaturation is reduced to 1.1 to 1.13, but not below 1.1. This latter is necessary for this reason: because with the variations in the temperature which become necessary by the varying vacuum an undersaturation, and in consequence a solution of grain, may easily take place. By and by, with the dropping purity of the mother-liquor, which is a consequence of the progressing crystallization, the quotient of oversaturation must be raised. This raising must during boiling take place slowly and uniformly until finally up to 1.2 in order to prevent any formation of new crystals. After obtaining an oversaturation-quotient of 1.2 boiling off commences. The purpose of boiling off is an essentially different one than the preceding boiling. By boiling off the masse-cuite is to be made suitable for further treatment. For this purpose the purity of the mother-liquor, which at the end of the boiling will still be about eighty-two, must, furthermore, be quickly reduced. A crystallization thus accelerated can only be obtained if the quotient of oversaturation is kept up high and so high that the mother-liquor would yield new crystals if no exciting crystals would be present. The acceleration of the crystallizing out with the high quotient of oversaturation and the great number of exciting crystals is such a quick one that the purity of the mother saccharine solution is carried down in one to two hours to from seventy-eight to seventy-five.

The boiling off commences, as above stated, with the quotient of oversaturation of 1.2, and this quotient will, with the dropping purity of the mother-liquor, be raised to 1.25, 1.30, and, finally, to 1.35 if boiling off takes place with the drawing in of syrup.

When boiling off with an oversaturation of 1.3 to 1.35 the masse-cuite is ready to be tapped off from the vacuum-pan.

If the saccharine solution to be crystallized out has an inferior or superior degree of purity to that hereinbefore mentioned, the quotients of oversaturation have of course to be kept somewhat higher or somewhat lower.

The following table of contents of water shows, as an example, how the boiling of thick juices or analogous juices may be carried on according to the process of the present invention:

*Table Showing Contents of Water for Saccharine Solutions of a Rather High Degree of Purity.*

| Boiling temperature, centigrades. | During the formation of grain; quotient of purity— | | Immediately after the formation of grain. | | During the boiling process. | | During boiling off. | | |
|---|---|---|---|---|---|---|---|---|---|
|  | 91 | 93 |  |  |  |  |  |  |  |
| Degrees C. | a. | a¹. | b. | c. | d. | e. | f. | g. | h. |
| 67½ | 17¼ | 18 | 20¾ | 20¼ | 19¼ | 18¾ | 18 | 17 | 16¼ |
| 70 | 16¾ | 17¾ | 20¼ | 19¾ | 19 | 18½ | 17½ | 16½ | 15¾ |
| 72½ | 16¼ | 17¼ | 20 | 19¼ | 18½ | 17¾ | 17¼ | 16¼ | 15¼ |
| 75 | 16 | 16¾ | 19½ | 19 | 18 | 17¼ | 16¾ | 15½ | 15 |
| 77½ | 15¼ | 16¼ | 19 | 18½ | 17¾ | 17 | 16½ | 15¼ | 14½ |
| 80 | 15¼ | 15¾ | 18½ | 18 | 17¼ | 16½ | 16 | 15 | 14¼ |
| 82½ | 15 | 15¼ | 18¼ | 17¾ | 16¾ | 16 | 15¼ | 14½ | 13¾ |
| 85 | 14¾ | 15¼ | 17¾ | 17¼ | 16¼ | 15¼ | 15 | 14 | 13¼ |

The use or employment of the table takes place, as is stated in my United States Patent No. 664,465, with the self-understood modifications and with the difference that the entire process of boiling can be terminated within six to ten hours, if boiling for a normal first product of sugar takes place. Formation of grain takes place without any artifice, quite by itself in the mass in motion and duly concentrated according to the table. Immediately after formation of grain has taken place the boiling which has been carried on according to column "a" is now gradually continued according to column "b," or from "a'" to "c," and this boiling process is carried on according to each of the columns "c" "d" "e" "f" for about one to two hours and, according to requirement, also according to the columns "g" and "h" for one to two hours.

In carrying on boiling according to the present process an extensive desaccharization as far as possible of the mother-liquor of the masse-cuite and a uniform grain is obtained.

I claim—

The process for controlling the oversaturation during boiling of saccharine juices especially thick or concentrated juices, consisting in keeping up a systematically-varying oversaturation, empirically determined, according to the purity of the saccarhine solution, establishing a decrease in oversaturation after formation of grain followed by a systematic increase of the oversaturation preparatory to boiling off according to the dropping purity of the mother-syrup.

In testimony that I claim the foregoing as my invention I have signed my name, in presence of two witnesses, this 8th day of August, 1902.

HERMANN CLAASSEN.

Witnesses:
LUDWIG HIRTZ,
WILLIAM ESSENWEIN.